(12) United States Patent
Tang

(10) Patent No.: US 8,077,400 B2
(45) Date of Patent: Dec. 13, 2011

(54) THIN TYPE OPTICAL LENS SYSTEM FOR TAKING IMAGE

(75) Inventor: Hsiang Chi Tang, Taichung (TW)

(73) Assignee: Largen Precision Co., Ltd., Taichung (TW)

( * ) Notice: Subject to any disclaimer, the term of this patent is extended or adjusted under 35 U.S.C. 154(b) by 0 days.

(21) Appl. No.: 12/883,181

(22) Filed: Sep. 16, 2010

(65) Prior Publication Data

US 2011/0007406 A1 Jan. 13, 2011

Related U.S. Application Data

(63) Continuation of application No. 11/964,710, filed on Dec. 27, 2007, now Pat. No. 7,898,747.

(30) Foreign Application Priority Data

Aug. 14, 2007 (TW) .............................. 96130044 A

(51) Int. Cl.
*G02B 13/18* (2006.01)
*G02B 9/12* (2006.01)
(52) U.S. Cl. ........................................ 359/716; 359/784
(58) Field of Classification Search .................. 359/716, 359/784
See application file for complete search history.

(56) References Cited

U.S. PATENT DOCUMENTS

2009/0190236 A1* 7/2009 Do ................................ 359/716
* cited by examiner

*Primary Examiner* — Scott J Sugarman

(57) ABSTRACT

An optical lens system for taking image comprises three lens elements with refractive power, from the object side to the image side: a first lens element with positive refractive power, a second lens element with negative refractive power having at least one aspheric surface, a third lens element with negative refractive power having at least one aspheric surface, and an aperture stop located between the first lens element and the second lens element. By such arrangements, it can effectively reduce the volume and the sensitivity of the lens system.

14 Claims, 6 Drawing Sheets

THIN TYPE OPTICAL LENS SYSTEM FOR TAKING IMAGE

This application is a continuation application of U.S. patent application Ser. No. 11/964,710, which claims the benefit of the earlier filing date of Dec. 27, 2007 now U.S. Pat. No. 7,898,747.

BACKGROUND OF THE INVENTION

1. Field of the Invention

The present invention relates to an optical lens system, and more particularly to a thin type optical lens system for taking image used in a mobile phone camera.

2. Description of the Prior Art

In recent years, with the popularity of mobile phone cameras, the optical lens system for taking image has become thinner and thinner, and the sensor of a general digital camera is none other than CCD (Charge Coupled Device) or CMOS (Complementary Metal Oxide Semiconductor). Due to advances in semiconductor manufacturing, the pixel size of sensors has been reduced continuously, and miniaturized optical lens systems for taking image have increasingly higher resolution. Therefore, there's increasing demand for image quality.

A conventional mobile phone camera's lens assembly usually consists of three lens elements: from the object side to the image side: a first lens element with positive refractive power, a second lens element with negative refractive power and a third lens element with positive refractive power, thus forming the so-called type of Triplet. To correct aberration, the optical lens system usually takes the form of "front aperture stop". However, the arrangement of front aperture stop will increase stray light and also result in a relatively sensitive optical design.

The present invention mitigates and/or eliminates the afore-mentioned disadvantages.

SUMMARY OF THE INVENTION

The primary objective of the present invention is to improve image quality and effectively reduce the volume of the optical lens system, the present invention provides a whole new three-lens type optical lens system.

A thin type optical lens system for taking image in accordance with the present invention comprises three lens elements with refractive power, from the object side to the image side:

a first lens element with positive refractive power;

an aperture stop;

a second lens element with negative refractive power having at least one aspheric surface;

a third lens element with negative refractive power having at least one aspheric surface.

In the present thin type optical lens system for taking image, the refractive power of the optical lens system for taking image of the present invention is mainly provided by the first lens element with positive refractive power, the second lens element with negative refractive power and the third lens element with negative refractive power serve to balance and correct the various aberrations caused by the system.

The first lens element provides strong positive refractive power, and the aperture stop is located closer to the object, so that the total optical length of the thin type optical lens system can be effectively shortened and the exit pupil of the optical lens system will be far away from the image plane. Therefore, the light will be projected onto the sensor with a relatively small incident angle, this is the Telecentric feature of the image, and in addition the third lens element is formed with at least one inflection point to contribute to a better correction of the incident angle of off axis light with respect to the sensor. The Telecentric feature is very important to the photosensitive power of the current solid-state sensor, and can improve the photosensitivity of the sensor while reducing the probability of the occurrence of shading. But, in the wide field of view optical system, it is necessary to correct the distortion and the chromatic aberration of magnification, and the correction method is to place the aperture stop closer to the image plane to balance the refractive power of the optical system. So the aperture stop of the thin type optical lens system for taking image in accordance with the present invention is located between the first lens element and the second lens element in order to balance the features of Telecentric and the wide field of view while effectively reducing the sensitivity of the thin type optical lens system for taking image.

With the trend of miniaturization of the optical lens system and the requirement of increasing the field of view, the focal length of the optical lens system is becoming very short. Therefore, the absolute value of the radius of curvature and the size of the lens elements must be very small, and it is impossible to make such glass lens elements by use of the conventional grinding method. Plastic material is introduced to make lens elements by injection molding, using relatively low cost to produce high precision lens elements. The surfaces of lens elements are aspheric, allowing more design parameters (than spherical surfaces), so as to better reduce the aberration and the number of the lens elements.

In the present thin type optical lens system for taking image, we can replace some plastic aspheric lenses by glass aspheric ones. Although glass is more expensive, it has better performance in terms of environment effects and correction for chromatic aberration.

In the present thin type optical lens system for taking image, the object-side surface of the first lens element with positive refractive power is convex, and the image-side surface of the first element with positive refractive power can be either convex or concave. When the image-side surface of the first lens element with positive refractive power is convex, the refractive power of the first lens element is relatively large, and the total optical length of the thin type optical lens system for taking image can be effectively shortened. When the image-side surface of the first lens element is concave, it can effectively reduce astigmatism of the thin type optical lens system for taking image. The object-side surface and the image-side surface of the second lens element with negative refractive power are concave and convex respectively. The object-side surface and the image-side surface of the third lens element with negative refractive power are convex and concave respectively. Using such a lens structure, image quality can be improved effectively.

In the present thin type optical lens system for taking image, the Abbe Number of the first lens element is V1, the Abbe Number of the second lens element is V2, the Abbe Number of the third lens element is V3, and they satisfy the relation:

$$(V1+V3)/2-V2>20$$

By selecting proper materials to satisfy the above relation, it can effectively correct the chromatic aberration caused by the system.

In the present thin type optical lens system for taking image, the focal length of the first lens element is f1, the focal length of the second lens element is f2, the focal length of the third lens element is f3, and the focal length of the thin type optical lens system is f, they satisfy the relations:

$$1.3 < f/f1 < 1.7$$

$$-0.5 < f/f2 < 0$$

$$-0.4 < f/f3 < 0$$

The first lens element serves to provide the main refractive power, if the value of f/f1 is smaller than the above lower limit, the refractive power of the thin type optical lens system for taking image will be weak, and the total track length will be too long. If the value of f/f1 is greater than the above upper limit, it will lead to large higher order aberrations. The second lens element serves to correct the chromatic aberration of the thin type optical lens system for taking image, if the value of f/f2 is greater than the above upper limit, it will be difficult to correct the chromatic aberration. If the value of f/f2 is smaller than the above lower limit, it will be difficult to suppress the incident angle of the light with respect to the sensor. The third lens element serves as a correcting lens element and has relatively small refractive power, so it is preferable for the third lens element to be within the above range. Further, it will be much better if the values of f/f1, f/f2 and f/f3 satisfy the relations:

$$1.35 < f/f1 < 1.5$$

$$-0.3 < f/f2 < 0$$

$$-0.2 < f/f3 < 0$$

In the present thin type optical lens system for taking image, the radius of curvature of the object-side surface of the first lens element is R1, the radius of curvature of the image-side surface of the first lens element is R2, and they satisfy the relation:

$$-0.9 < R1/R2 < -0.1$$

If the value of R1/R2 is not within the above range, it will be difficult to correct the astigmatism of the system.

In the present thin type optical lens system for taking image, the radius of curvature of the object-side surface of the second lens element is R3, the radius of curvature of the image-side surface of the second lens element is R4, and they satisfy the relation:

$$0.4 < R3/R4 < 1.0$$

If the value of R3/R4 is smaller the above lower limit, the absolute value of R3 will be relatively small, and the total track length of the system will be too long. On the other hand, if the value of R3/R4 is greater than the above upper limit, the absolute value of R3 will be relatively large, and it will be difficult to correct the chromatic aberration of the system.

In the present thin type optical lens system for taking image, the radius of curvature of the object-side surface of the third lens element is R5, the radius of curvature of the image-side surface of the third lens element is R6, and they satisfy the relation:

$$0.6 < R5/R6 < 1.6$$

By satisfying the above relation, high order aberrations of the system can be effectively corrected.

Further, it will be much better if the values of R1/R2, R3/R4 and R5/R6 satisfy the relations:

$$-0.8 < R1/R2 < -0.5$$

$$0.55 < R3/R4 < 0.85$$

$$0.9 < R5/R6 < 1.4$$

In the present thin type optical lens system for taking image, the refractive index of the first lens element is N1, the refractive index of the third lens element is N3, and they satisfy the relations:

$$1.54 < N1 < 1.6$$

$$1.5 < N3 < 1.6$$

If the refractive index of the first lens element and the refractive index of the third lens element satisfy the above relations, the plastic optical material whose refractive index is within the above range is better matched to the optical lens system.

In the present thin type optical lens system for taking image, if the first lens element is made of glass, it can effectively improve the refractive power of the first lens element, thus reducing the total track length.

In the present thin type optical lens system for taking image, the tangential angle of an image-side surface of the third lens element at the position of its effective optical diameter is ANG32, and it satisfies the relation:

$$ANG32 < -10 \text{ deg.}$$

The tangential angle at a point on the surface of a lens is defined as the angle between the tangential plane, Plane Tan, passing through that point and a plane, Plane Norm, normal to the optical axis and passing through that point. Let T and N be the points of intersection between the optical axis and planes, Plane Tan and Plane Norm, respectively. This tangential angle is less than 90 degree in absolute value. The sign of the tangential angle is taken to be negative if N is closer than T to the object side of the optical lens system, and positive otherwise.

The above relation can effectively reduce the incident angle of the light with respect to the sensor while improving the correction of the off axis aberration.

In the present thin type optical lens system for taking image, the height of the object-side surface of the third lens element at the position of its effective diameter is SAG31, and it satisfies the relation:

$$SAG31 < 0.2 \text{ mm}$$

The height of a surface at the position of the effective diameter is defined as: the height of a point on the surface at the effective diameter relative to a plane normal to the axis passing through the on-axis surface vertex. When the surface at the position of the effective diameter is closer to the image side than the on-axis surface vertex, the height is positive; if instead the surface at the position of the effective diameter is closer to the object side than the on-axis surface vertex, the height is negative. The above relations can effectively avoid the radiation of the off-axis rays and enhance the stability of the optical system.

In the present thin type optical lens system for taking image, the on-axis distance between the second lens element and the third lens element is T23, the center thickness of the second lens element is CT2, and the center thickness of the third lens element is CT3, and they satisfy the relations:

$$T23/CT2 < 0.3$$

$$T23/CT3 < 0.3$$

The above relations can effectively reduce the total track length of the system.

Further, it will be much better if the values of T23/CT3 and T23 satisfy the relations:

T23/CT3<0.25;

T23<0.15 mm

In the present thin type optical lens system for taking image, the incident angle of the chief ray at the maximum image height on the image plane is CRA (Chief Ray Angle), and half of the maximal field of view is HFOV, and they satisfy the relation:

0.45<tan(CRA)/tan(HFOV)<1.15

The above relation can make the sensor match the thin type optical lens system for taking image while providing the feature of wide field of view to the system.

In the present thin type optical lens system for taking image, an object to be photographed is imaged on an electronic sensor, a total track length of the optical lens system is TTL, the maximum image height of the optical lens system is ImgH, and they satisfy the relation:

TL/ImgH<2.65

The above relation contributes to the miniaturization of the optical lens system for taking image.

DETAILED DESCRIPTION OF THE PREFERRED EMBODIMENTS

Figure 1:
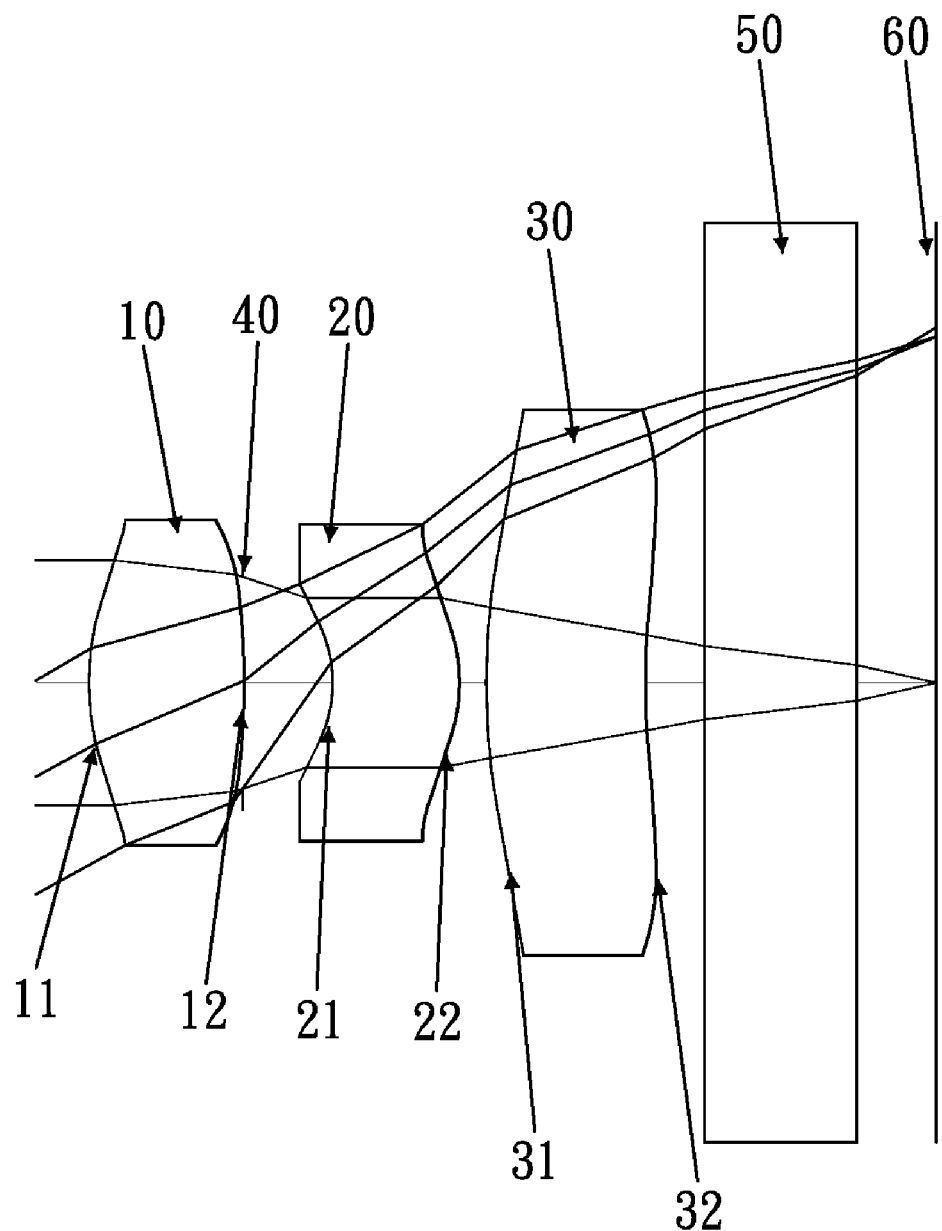
FIG. 1 shows an optical lens system for taking image in accordance with a first embodiment of the present invention.
Figure 2:
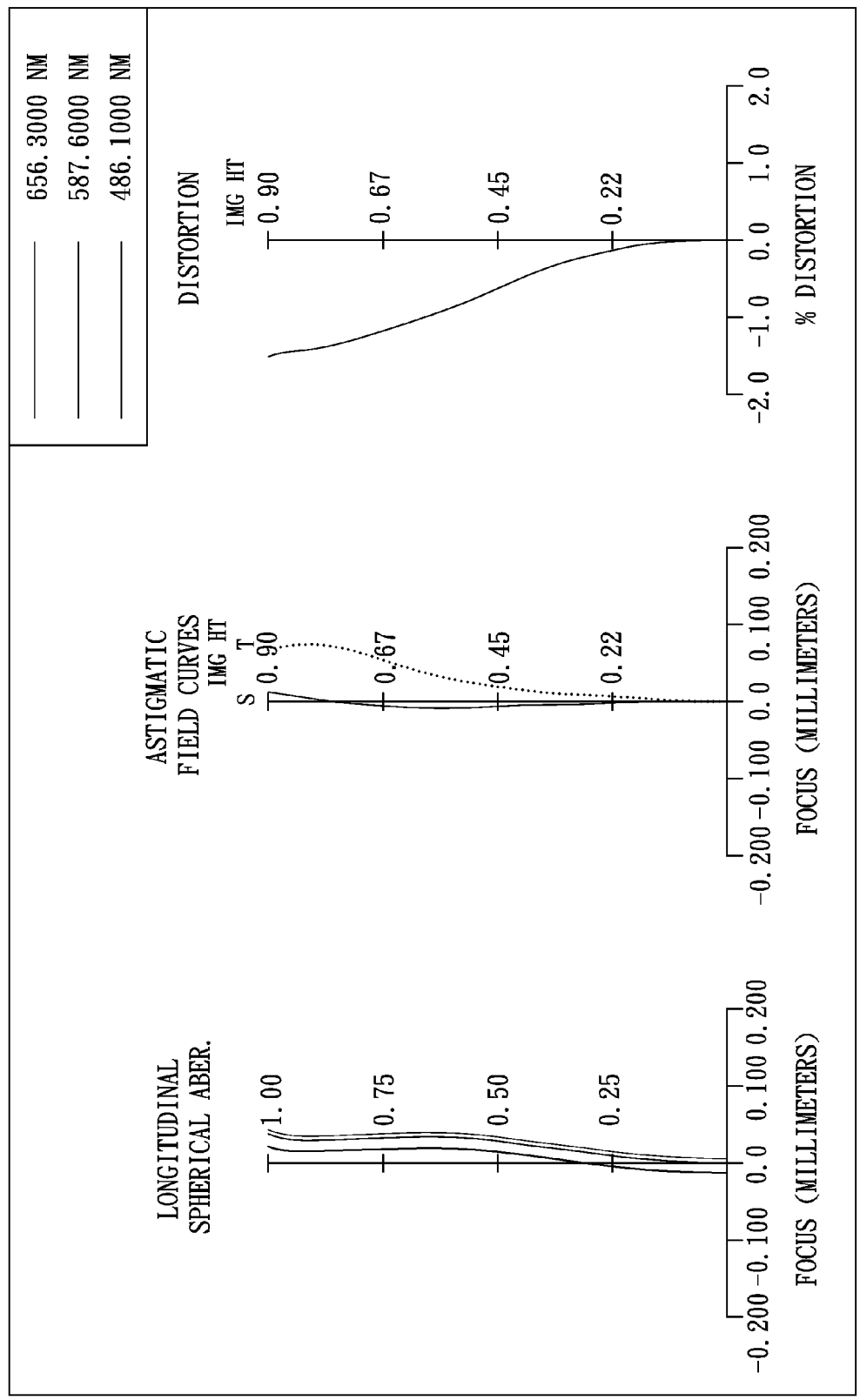
FIG. 2 shows the aberration curve of the first embodiment of the present invention.

Referring to FIG. 1, which shows a thin type optical lens system for taking image in accordance with a first embodiment of the present invention, and FIG. 2 shows the aberration curve of the first embodiment of the present invention. The first embodiment of the present invention is a thin type optical lens system for taking image comprising three lens elements with refractive power, and the thin type optical lens system for taking image comprises: from the object side to the image side:

A plastic first lens element 10 with positive refractive power has a convex object-side surface 11 and a convex image side-surface 12, and both the object-side surface 11 and the image-side surface 12 of the first lens element 10 are aspheric.

A plastic second lens element 20 with negative refractive power has a concave object-side surface 21 and a convex image-side surface 22, and both the object-side surface 21 and the image-side surface 22 of the second lens element 20 are aspheric.

A plastic third lens element 30 with negative refractive power has a convex object-side surface 31 and a concave image-side surface 32, both the object-side surface 31 and the image-side surface 32 of the third lens element 30 are aspheric, and an inflection point is formed on each of the object-side surface 31 and the image-side surface 32.

An aperture stop 40 is located between the first lens element 10 and the second lens element 20.

An IR cut filter 50 is located behind the third lens element 30 and has no influence on the focal length of the optical lens system.

The image plane 60 is located behind the IR cut filter 50.

The equation of the curves of the aspheric surfaces is expressed as follows:

$$X(Y) = (Y^2/R)/(1+sqrt(1-(1+k)*(Y/R)^2)) + \sum_i (Ai)*(Y^i)$$

wherein:

X: the height of a point on the aspheric lens surface at a distance Y from the optical axis relative to the tangential plane of the aspheric surface vertex;

Y: the distance from the point on the curve of the aspheric surface to the optical axis;

k: represents the conic coefficient;

Ai: the aspheric surface coefficient of order i.

In the first embodiment of the present thin type optical lens system for taking image, the focal length of the first lens element is f1, the focal length of the second lens element is f2, the focal length of the third lens element is f3, the focal length of the thin type optical lens system for taking image is f, and they satisfy the relations:

f/f1=1.322 f/f2=−0.182 f/f3=−0.022

In the first embodiment of the present thin type optical lens system for taking image, the Abbe number of the first lens element is V1, the Abbe number of the second lens element is V2, and the Abbe number of the third lens element is V3, and they satisfy the relation:

(V1+V3)/2−V2=33.0

In the first embodiment of the present thin type optical lens system for taking image, the refractive index of the first lens element is N1, the refractive index of the third lens element is N3, and they satisfy the relations:

N1=1.543

N3=1.53

In the first embodiment of the present thin type optical lens system for taking image, the radius of curvature of the object-side surface of the first lens element is R1, and the radius of curvature of the image-side surface of the first lens element is R2. The radius of curvature of the object-side surface of the second lens element is R3, and the radius of curvature of the image-side surface of the second lens element is R4. The radius of curvature of the object-side surface of the third lens element is R5, and the radius of curvature of the image-side surface of the third lens element is R6. And they satisfy the relations:

R1/R2=−0.68

R3/R4=0.69

R5/R6=1.16

In the first embodiment of the present thin type optical lens system for taking image, the tangential angle of an image-side surface of the third lens element at the position of its effective optical diameter is ANG32, and ANG32=−12.6 deg The definition of the tangential angle is the same as before.

In the present thin type optical lens system for taking image, the height of the object-side surface of the third lens element at the position of its effective diameter is SAG31, and it satisfies the relation:

SAG31=0.08 mm

The definition of the height of a surface at the position of its effective diameter is the same as before.

In the first embodiment of the present thin type optical lens system for taking image, the center thickness of the second lens element is CT2, the center thickness of the third lens element is CT3, and the on-axis distance between the second lens element and the third lens element is T23, and they satisfy the relations:

T23=0.07 mm
T23/CT2=0.2
T23/CT3=0.17

In the first embodiment of the present thin type optical lens system for taking image, the incident angle of the chief ray at the maximum image height on the image plane is CRA (Chief Ray Angle), half of the maximal field of view is HFOV, and they satisfy the relation:

tan(CRA)/tan(HFOV)=0.84

In the first embodiment of the present thin type optical lens system for taking image, the total track length of the optical lens system is TTL, the maximum image height of the optical lens system is ImgH, and they satisfy the relation:

TTL/ImgH=2.57

The detailed optical data of the first embodiment is shown in table 1, and the aspheric surface data is shown in table 2, wherein the units of the radius of curvature, the thickness and the focal length are expressed in mm, and HFOV is defined as half of the maximal field of view.

TABLE 1

(Embodiment 1)
f = 1.54 mm, Fno = 2.0, HFOV = 30.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 0.99002 (ASP) | 0.428 | Plastic | 1.543 | 56.8 | 1.15 |
| 2 | | −1.44729 (ASP) | −0.048 | | | | |
| 3 | Ape. Stop | Plano | 0.272 | | | | |
| 4 | Lens 2 | −0.40432 (ASP) | 0.350 | Plastic | 1.632 | 23.4 | −8.37 |
| 5 | | −0.58497 (ASP) | 0.070 | | | | |
| 6 | Lens3 | 1.13793 (ASP) | 0.373 | Plastic | 1.530 | 56.0 | −69.31 |
| 7 | | 0.97819 (ASP) | 0.150 | | | | |
| 8 | IR-filter | Plano | 0.400 | Glass | 1.517 | 64.2 | — |
| 9 | | Plano | 0.257 | | | | |
| 10 | Image | Plano | | | | | |

TABLE 2

Aspheric Coefficients

| | Surface # | | | | | |
|---|---|---|---|---|---|---|
| | 1 | 2 | 4 | 5 | 6 | 7 |
| K = | −2.22592E−01 | 2.48992E−01 | −1.62364E+00 | −7.28165E+00 | −3.20183E+00 | −9.74535E+00 |
| A4 = | −7.56787E−01 | −8.84608E−01 | 1.54701E+00 | −2.35307E+00 | −9.40367E−01 | −6.10921E−01 |
| A6 = | 4.03109E+00 | −2.98466E+00 | −6.17100E+01 | 1.50498E+01 | 2.09575E+00 | 6.70652E−01 |
| A8 = | −3.25903E+01 | 7.53517E+00 | 1.02419E+03 | −2.11830E+01 | −3.67567E+00 | −9.85829E−01 |
| A10 = | — | — | −6.93056E+03 | 9.47943E+00 | 6.05504E+00 | 6.80850E−01 |
| A12 = | — | — | 1.71634E+04 | — | −5.63284E+00 | 5.93237E−01 |
| A14 = | — | — | — | — | — | −1.01103E+00 |

Figure 3:
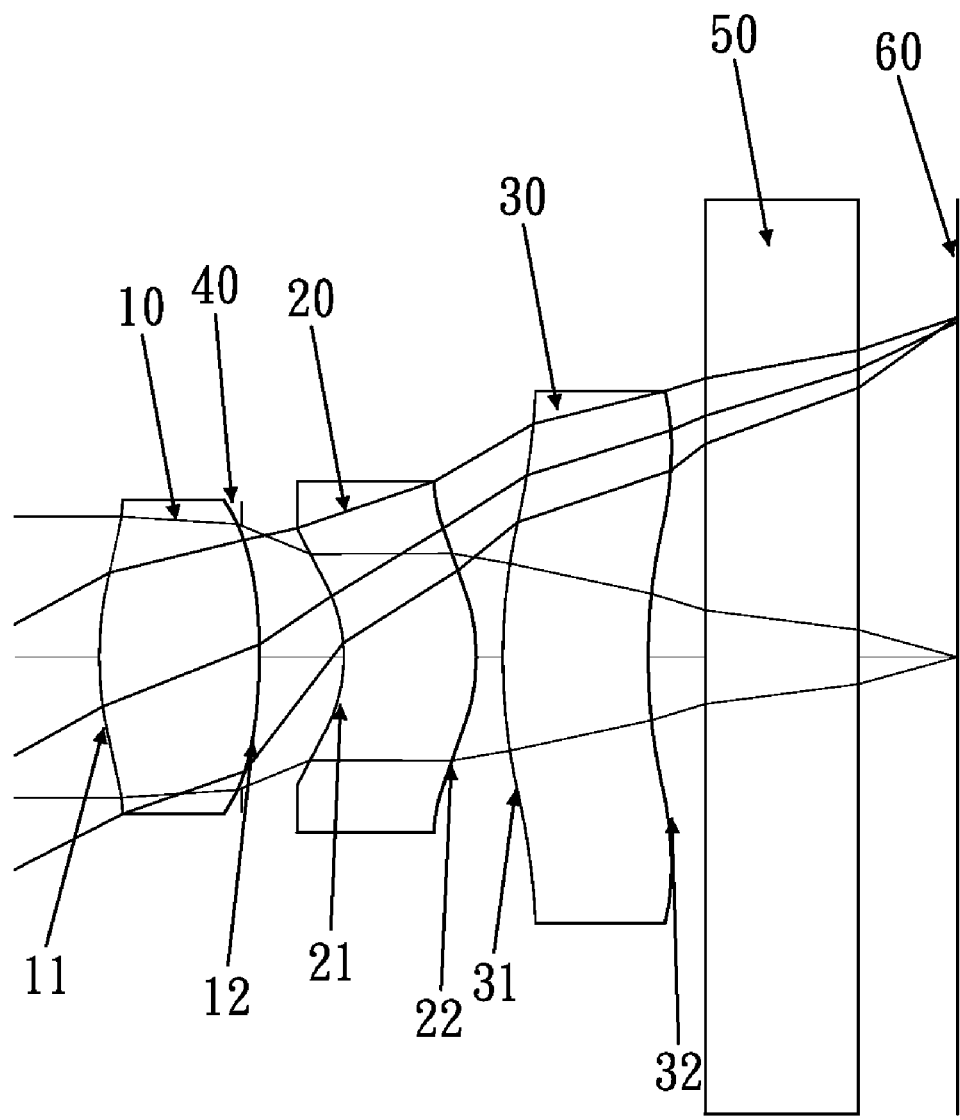
FIG. 3 shows an optical lens system for taking image in accordance with a second embodiment of the present invention.
Figure 4:
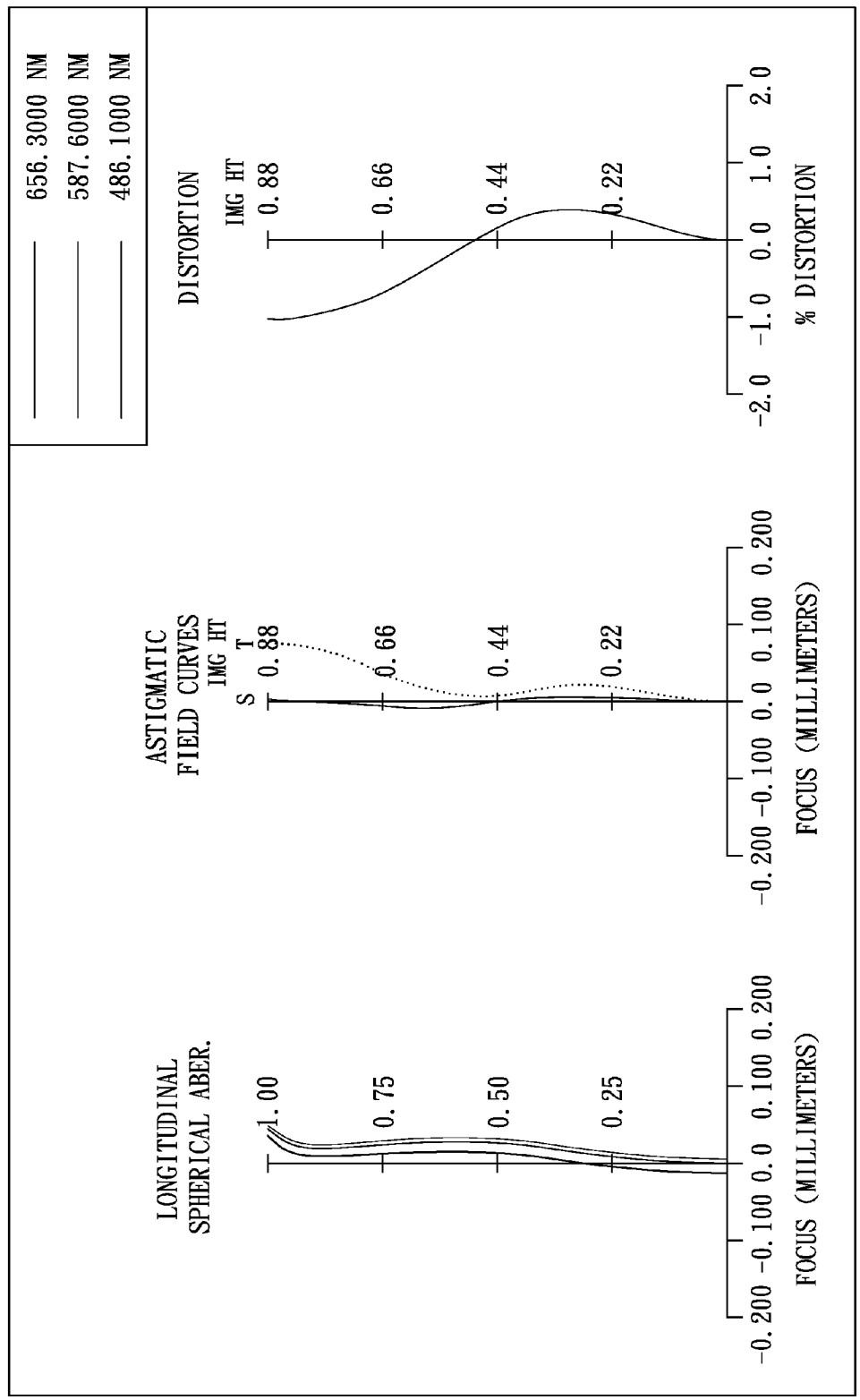
FIG. 4 shows the aberration curve of the second embodiment of the present invention.

Referring to FIG. 3, which shows a thin type optical lens system for taking image in accordance with a second embodiment of the present invention, and FIG. 4 shows the aberration curve of the second embodiment of the present invention. The second embodiment of the present invention is a thin type optical lens system for taking image comprising three lens elements with refractive power, and the optical lens system for taking image comprises: from the object side to the image side:

A plastic first lens element 10 with positive refractive power has a convex object-side surface 11 and a convex image-side surface 12, and both the object-side surface 11 and the image-side surface 12 of the first lens element 10 are aspheric.

A plastic second lens element 20 with negative refractive power has a concave object-side surface 21 and a convex image-side surface 22, and both the object-side surface 21 and the image-side surface 22 of the second lens element 20 are aspheric.

A plastic third lens element 30 with negative refractive power has a convex object-side surface 31 and a concave image-side surface 32, both the object-side surface 31 and the image-side surface 32 of the third lens element 30 are aspheric, and an inflection point is formed on each of the object-side surface 31 and the image-side surface 32.

An aperture stop 40 is located between the first lens element 10 and the second lens element 20.

An IR cut filter 50 is located behind the third lens element 30 and has no influence on the focal length of the optical lens system.

The image plane 60 is located behind the IR cut filter 50.

The equation of the curves of the aspheric surfaces of the second embodiment has the same form as that of the first embodiment.

In the second embodiment of the present thin type optical lens system for taking image, the focal length of the first lens element is f1, the focal length of the second lens element is f2, the focal length of the third lens element is f3, the focal length of the thin type optical lens system for taking image is f, and they satisfy the relations:

$f/f1=1.320$ $f/f2=-0.180$ $f/f3=-0.020$

In the second embodiment of the present thin type optical lens system for taking image, the Abbe number of the first lens element is V1, the Abbe number of the second lens element is V2, and the Abbe number of the third lens element is V3, and they satisfy the relation:

$(V1+V3)/2-V2=26.2$

In the second embodiment of the present thin type optical lens system for taking image, the refractive index of the first lens element is N1, the refractive index of the third lens element is N3, and they satisfy the relations:

$N1=1.543$ $N3=1.53$

In the second embodiment of the present thin type optical lens system for taking image, the radius of curvature of the object-side surface of the first lens element is R1, and the radius of curvature of the image-side surface of the first lens element is R2. The radius of curvature of the object-side surface of the second lens element is R3, and the radius of curvature of the image-side surface of the second lens element is R4. The radius of curvature of the object-side surface of the third lens element is R5, and the radius of curvature of the image-side surface of the third lens element is R6. And they satisfy the relations:

$R1/R2=-0.27$ $R3/R4=0.70$ $R5/R6=1.14$

In the second embodiment of the present thin type optical lens system for taking image, the tangential angle of an image-side surface of the third lens element at the position of its effective optical diameter is ANG32, and ANG32=−23.3 deg.

The definition of the tangential angle is the same as before.

In the present thin type optical lens system for taking image, the height of the object-side surface of the third lens element at the position of its effective diameter is SAG31, and it satisfies the relation:

$SAG31=0.08$ mm

The definition of the height of a surface at the position of its effective diameter is the same as before.

In the second embodiment of the present thin type optical lens system for taking image, the center thickness of the second lens element is CT2, the center thickness of the third lens element is CT3, the on-axis distance between the second lens element and the third lens element is T23, and they satisfy the relations:

$T23=0.07$ mm $T23/CT2=0.21$ $T23/CT3=0.19$

In the second embodiment of the present thin type optical lens system for taking image, the incident angle of the chief ray at the maximum image height on the image plane is CRA (Chief Ray Angle), half of the maximal field of view is HFOV, and they satisfy the relation:

$\tan(CRA)/\tan(HFOV)=0.72$

In the second embodiment of the present thin type optical lens system for taking image, the total track length of the optical lens system is TTL, the maximum image height of the optical lens system is ImgH, and they satisfy the relation:

$TTL/ImgH=2.46$

The detailed optical data of the second embodiment is shown in table 3, and the aspheric surface data is shown in table 4, wherein the units of the radius of curvature, the thickness and the focal length are expressed in mm, and HFOV is defined as half of the maximal field of view.

TABLE 3

(Embodiment 2)
f = 1.59 mm, Fno = 2.4, HFOV = 30.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 0.78575 (ASP) | 0.406 | Plastic | 1.543 | 56.8 | 1.18 |
| 2 | | −2.93842 (ASP) | −0.008 | | | | |
| 3 | Ape. Stop | Plano | 0.241 | | | | |
| 4 | Lens 2 | −0.39278 (ASP) | 0.330 | Plastic | 1.583 | 30.2 | −8.54 |
| 5 | | −0.55868 (ASP) | 0.070 | | | | |
| 6 | Lens3 | 1.62668 (ASP) | 0.418 | Plastic | 1.530 | 56.0 | −78.39 |
| 7 | | 1.42589 (ASP) | 0.150 | | | | |
| 8 | IR-filter | Plano | 0.400 | Glass | 1.517 | 64.2 | — |
| 9 | | Plano | 0.210 | | | | |
| 10 | Image | Plano | | | | | |

TABLE 4

Aspheric Coefficients

| | Surface # | | | | | |
|---|---|---|---|---|---|---|
| | 1 | 2 | 4 | 5 | 6 | 7 |
| K = | −1.82623E+00 | 1.89941E+01 | −2.09553E+00 | −4.16937E+00 | −3.53611E−01 | −2.36418E+01 |
| A4 = | −1.19108E−01 | −5.54472E−01 | −1.13456E−01 | −6.64970E−01 | −3.87353E−01 | −5.97546E−01 |
| A6 = | 4.29150E+00 | −7.62808E+00 | −6.95327E+01 | 9.21954E+00 | 1.37445E+00 | 1.06835E+00 |
| A8 = | −3.08943E+01 | 2.50967E+01 | 1.68136E+03 | −4.48415E+00 | −5.23240E+00 | −1.85964E+00 |
| A10 = | — | — | −1.56568E+04 | −2.21288E+01 | 9.03384E+00 | 9.25342E−01 |
| A12 = | — | — | 5.09766E+04 | — | −5.69072E+00 | −5.22969E−02 |
| A14 = | — | — | — | — | — | 2.46277E−01 |

Figure 5:
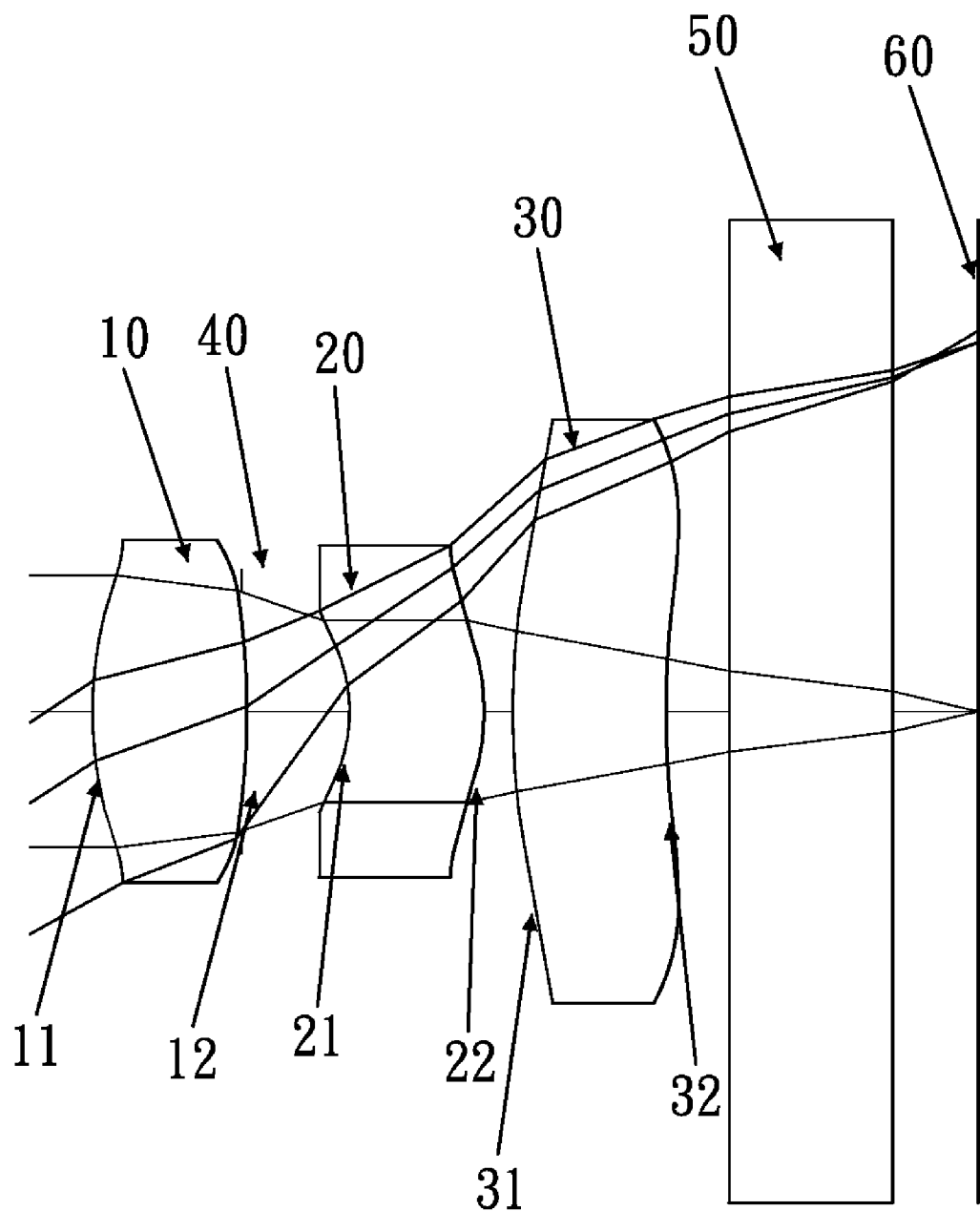
FIG. 5 shows an optical lens system for taking image in accordance with a third embodiment of the present invention.
Figure 6:
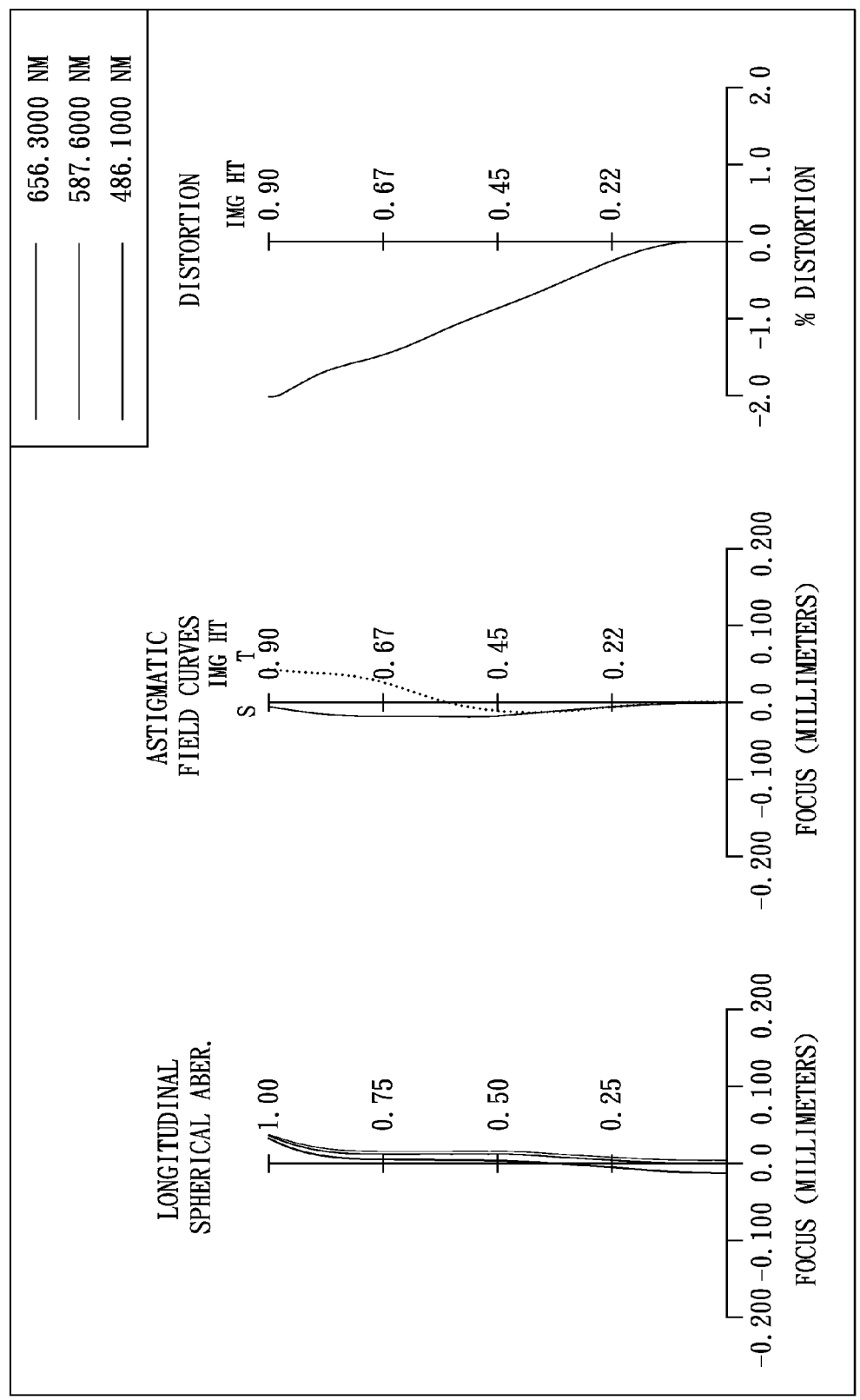
FIG. 6 shows the aberration curve of the third embodiment of the present invention.

Referring to FIG. 5, which shows a thin type optical lens system for taking image in accordance with a third embodiment of the present invention, and FIG. 6 shows the aberration curve of the third embodiment of the present invention. The third embodiment of the present invention is a thin type optical lens system for taking image comprising three lens elements with refractive power, and the optical lens system for taking image comprises: from the object side to the image side:

A glass first lens element 10 with positive refractive power has a convex object-side surface 11 and a convex image-side surface 12, and both the object-side surface 11 and the image-side surface 12 of the first lens element 10 are aspheric.

A plastic second lens element 20 with negative refractive power has a concave object-side surface 21 and a convex image-side surface 22, and both the object-side surface 21 and the image-side surface 22 of the second lens element 20 are aspheric.

A plastic third lens element 30 with negative refractive power has a convex object-side surface and a concave image-side surface 32, both the object-side surface 31 and the image-side surface 32 of the third lens element 30 are aspheric, and an inflection point is formed on the image-side surface 32.

An aperture stop 40 is located between the first lens element 10 and the second lens element 20.

An IR cut filter 50 is located behind the third lens element 30 and has no influence on the focal length of the optical lens system.

An image plane 60 is located behind the IR cut filter 50.

The equation of the curves of the aspheric surfaces of the third embodiment has the same form as that of the first embodiment.

In the third embodiment of the present thin type optical lens system for taking image, the focal length of the first lens element is f1, the focal length of the second lens element is f2, the focal length of the third lens element is f3, the focal length of the thin type optical lens system for taking image is f, and they satisfy the relations:

$$f/f1=1.390$$

$$f/f2=-0.190$$

$$f/f3=-0.100$$

In the third embodiment of the present thin type optical lens system for taking image, the Abbe number of the first lens element is V1, the Abbe number of the second lens element is V2, and the Abbe number of the third lens element is V3, and they satisfy the relation:

$$(V1+V3)/2-V2=38.1$$

In the third embodiment of the present thin type optical lens system for taking image, the refractive index of the first lens element is N1, the refractive index of the third lens element is N3, and they satisfy the relations:

$$N1=1.592$$

$$N3=1.53$$

In the third embodiment of the present thin type optical lens system for taking image, the radius of curvature of the object-side surface of the first lens element is R1, and the radius of curvature of the image-side surface of the first lens element is R2. The radius of curvature of the object-side surface of the second lens element is R3, and the radius of curvature of the image-side surface of the second lens element is R4. The radius of curvature of the object-side surface of the third lens element is R5, and the radius of curvature of the image-side surface of the third lens element is R6. And they satisfy the relations:

$R1/R2=-0.29$ $R3/R4=0.70$ $R5/R6=1.30$

In the third embodiment of the present thin type optical lens system for taking image, the tangential angle at the position of the effective optical diameter of an image-side surface of the third lens element is ANG32, and ANG32=−29.1 deg.

The definition of the tangential angle is the same as before.

In the present thin type optical lens system for taking image, the height of the object-side surface of the third lens element at the position of its effective diameter is SAG31, and it satisfies the relation:

$SAG31=0.08$ mm

The definition of the height of a surface at the position of its effective diameter is the same as before.

In the third embodiment of the present thin type optical lens system for taking image, the center thickness of the second lens element is CT2, the center thickness of the third lens element is CT3, the on-axis distance between the second lens element and the third lens element is T23, and they satisfy the relations:

$T23=0.07$ mm $T23/CT2=0.21$ $T23/CT3=0.18$

In the third embodiment of the present thin type optical lens system for taking image, the incident angle of the chief ray at the maximum image height on the image plane is CRA (Chief Ray Angle), half of the maximal field of view is HFOV, and they satisfy the relation:

$\tan(CRA)/\tan(HFOV)=0.66$

In the third embodiment of the present optical lens system for taking image, the total track length of the optical lens system is TTL, the maximum image height of the optical lens system is ImgH, and they satisfy the relation:

$TTL/ImgH=2.42$

The detailed optical data of the third embodiment is shown in table 5, and the aspheric surface data is shown in table 6, wherein the units of the radius of curvature, the thickness and the focal length are expressed in mm, and HFOV is defined as half of the maximal field of view.

TABLE 5

(Embodiment 3)
f = 1.59 mm, Fno = 2.4, HFOV = 30.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 0.84044 (ASP) | 0.382 | Glass | 1.592 | 67.0 | 1.14 |
| 2 | | −2.85073 (ASP) | −0.012 | | | | |
| 3 | Ape. Stop | Infinity | 0.265 | | | | |
| 4 | Lens 2 | −0.39653 (ASP) | 0.330 | Plastic | 1.632 | 23.4 | −8.22 |
| 5 | | −0.56801 (ASP) | 0.070 | | | | |
| 6 | Lens3 | 1.65446 (ASP) | 0.381 | Plastic | 1.530 | 56.0 | −15.8 |
| 7 | | 1.27186 (ASP) | 0.150 | | | | |
| 8 | IR-filter | Plano | 0.400 | Glass | 1.517 | 64.2 | — |
| 9 | | Plano | 0.210 | | | | |
| 10 | Image | Plano | | | | | |

TABLE 6

Aspheric Coefficients

| | Surface # | | | | | |
|---|---|---|---|---|---|---|
| | 1 | 2 | 4 | 5 | 6 | 7 |
| K = | −2.02893E+00 | 2.60577E+01 | −2.47178E+00 | −4.72889E+00 | −6.42561E−01 | −2.57746E+01 |
| A4 = | −1.70238E−01 | −6.96842E−01 | 9.59501E−02 | −5.05259E−01 | −4.03414E−01 | −6.74464E−01 |
| A6 = | 2.96398E+00 | −5.70122E+00 | −7.26287E+01 | 9.44893E+00 | 1.37189E+00 | 1.07788E+00 |
| A8 = | −3.07548E+01 | 1.79221E+01 | 1.68677E+03 | −4.80258E+00 | −5.22113E+00 | −1.90412E+00 |
| A10 = | — | — | −1.55035E+04 | −2.02834E+00 | 9.14674E+00 | 7.11250E−01 |
| A12 = | — | — | 5.09766E+04 | — | −5.35490E+00 | −1.72584E−01 |
| A14 = | — | — | — | — | — | 1.07505E+00 |

TABLE 7

|  | Embodiment 1 | Embodiment 2 | Embodiment 3 |
|---|---|---|---|
| f | 1.59 | 1.54 | 1.59 |
| Fno | 2.4 | 2.0 | 2.4 |
| HFOV | 30.0 | 30.0 | 30.0 |
| (V1 + V3)/2 − V2 | 26.2 | 33.0 | 38.1 |
| N1 | 1.543 | 1.543 | 1.592 |
| N3 | 1.530 | 1.530 | 1.530 |
| f/f1 | 1.320 | 1.322 | 1.390 |
| f/f2 | −0.180 | −0.182 | −0.190 |
| f/f3 | −0.020 | −0.022 | −0.100 |
| R1/R2 | −0.27 | −0.68 | −0.29 |
| R3/R4 | 0.70 | 0.69 | 0.70 |
| R5/R6 | 1.14 | 1.16 | 1.30 |
| T23 | 0.07 | 0.07 | 0.07 |
| T23/CT2 | 0.21 | 0.20 | 0.21 |
| T23/CT3 | 0.17 | 0.19 | 0.18 |
| ANG32 | −23.3 | −12.6 | −29.1 |
| SAG31 | 0.08 | 0.08 | 0.08 |
| tan(CRA)/tan(HFOV) | 0.72 | 0.84 | 0.66 |
| TTL/ImgH | 2.46 | 2.57 | 2.42 |

It is to be noted that the tables 1-6 show different data of the different embodiments, however, the data of the different embodiments is obtained from experiments. Therefore, any product of the same structure is deemed to be within the scope of the present invention even if it uses different data. Table 7 is the data relevant to the present invention of the respective embodiments.

While we have shown and described various embodiments in accordance with the present invention, it should be clear to those skilled in the art that further embodiments may be made without departing from the scope of the present invention.

What is claimed is:

1. A thin type optical lens system for taking image comprising three lens elements with refractive power, from the object side to the image side:
    a first lens element with positive refractive power having a convex aspheric object-side surface and a convex aspheric image-side surface;
    an aperture stop;
    a second lens element with negative refractive power having a concave aspheric object-side surface and a convex aspheric image-side surface;
    a third lens element with negative refractive power having a convex aspheric object-side surface and a concave aspheric image-side surface, and the third lens element being formed with at least one inflection point;
    wherein the first lens element, the second lens element and the third lens element are made of plastic material;
    wherein an on axis distance between the second lens element and the third lens element is T23, a center thickness of the third lens element is CT3, an Abbe number of the first lens element is V1, an Abbe number of the second lens element is V2, an Abbe number of the third lens element is V3, a focal length of the first lens element is f1, a focal length of the second lens element is f2, a focal length of the third lens element is f3, a focal length of the thin type optical lens system for taking image is f, and they satisfy the relations:

$T23/CT3<0.3$;

$(V1+V3)/2-V2>20$;

$1.35<f/f1<1.5$;

$-0.3<f/f2<0$;

$-0.2<f/f3<0$.

2. A thin type optical lens system for taking image comprising three lens elements with refractive power, from the object side to the image side:
    a first lens element with positive refractive power having a convex object-side surface and a convex image-side surface;
    an aperture stop;
    a second lens element with negative refractive power having a concave aspheric object-side surface and a convex aspheric image-side surface;
    a third lens element with negative refractive power having a convex aspheric object-side surface and a concave aspheric image-side surface, and the third lens element being formed with at least one inflection point;
    wherein a radius of curvature of the object-side surface of the first lens element is R1, a radius of curvature of the image-side surface of the first lens element is R2, an on axis distance between the second lens element and the third lens element is T23, a center thickness of the third lens element is CT3, and they satisfy the relations:

$-0.9<R1/R2<-0.1$;

$T23/CT3<0.3$.

3. The thin type optical lens system for taking image as claimed in claim 2, wherein a radius of curvature of the object-side surface of the second lens element is R3, and a radius of curvature of the image-side surface of the second lens element is R4, and they satisfy the relation:

$0.4<R3/R4<1.0$.

4. The thin type optical lens system for taking image as claimed in claim 3, wherein a radius of curvature of the object-side surface of the third lens element is R5, and a radius of curvature of the image-side surface of the third lens element is R6, and they satisfy the relation:

$0.6<R5/R6<1.6$.

5. The thin type optical lens system for taking image as claimed in claim 4, wherein the radius of curvature of the object-side surface of the first lens element is R1, and the radius of curvature of the image-side surface of the first lens element is R2, the radius of curvature of the object-side surface of the second lens element is R3, and the radius of curvature of the image-side surface of the second lens element is R4, the radius of curvature of the object-side surface of the third lens element is R5, and the radius of curvature of the image-side surface of the third lens element is R6, and they satisfy the relations:

$-0.8<R1/R2<-0.5$ $0.55<R3/R4<0.85$ $0.9<R5/R6<1.4$.

6. A thin type optical lens system for taking image comprising three lens elements with refractive power, from the object side to the image side:
    a first lens element with positive refractive power having a convex aspheric object-side surface and a convex aspheric image-side surface;
    an aperture stop;
    a second lens element with negative refractive power having a concave aspheric object-side surface and a convex aspheric image-side surface;
    a third lens element with negative refractive power having a convex aspheric object-side surface and a concave aspheric image-side surface, and the third lens element being formed with at least one inflection point;
wherein the first lens element, the second lens element and the third lens element are made of plastic material;
wherein a refractive index of the first lens element is N1, a refractive index of the third lens element is N3, an on axis distance between the second lens element and the third lens element is T23, a center thickness of the third lens element is CT3, an Abbe number of the first lens element is V1, an Abbe number of the second lens element is V2, an Abbe number of the third lens element is V3, and they satisfy the relations:

$1.54 < N1 < 1.6$;

$1.5 < N3 < 1.6$;

$T23/CT3 < 0.3$;

$(V1+V3)/2 - V2 > 20$.

7. A thin type optical lens system for taking image comprising three lens elements with refractive power, from the object side to the image side:
   a first lens element with positive refractive power having a convex aspheric object-side surface and a convex aspheric image-side surface;
   an aperture stop;
   a second lens element with negative refractive power having a concave aspheric object-side surface and a convex aspheric image-side surface;
   a third lens element with negative refractive power having a convex aspheric object-side surface and a concave aspheric image-side surface, and the third lens element being formed with at least one inflection point;
   wherein the first lens element, the second lens element and the third lens element are made of plastic material;
   wherein an incident angle of the chief ray at the maximum image height on the image plane is CRA (Chief Ray Angle), half of the maximal field of view is HFOV, an on axis distance between the second lens element and the third lens element is T23, a center thickness of the third lens element is CT3, an Abbe number of the first lens element is V1, an Abbe number of the second lens element is V2, an Abbe number of the third lens element is V3, and they satify the relations:

$0.45 < \tan(CRA)/\tan(HFOV) < 1.15$;

$T23/CT3 < 0.3$;

$(V1+V3)/2 - V2 > 20$.

8. A thin type optical lens system for taking image comprising three lens elements with refractive power, from the object side to the image side:
   a first lens element with positive refractive power having a convex aspheric object-side surface and a convex aspheric image-side surface;
   an aperture stop;
   a second lens element with negative refractive power having a concave aspheric object-side surface and a convex aspheric image-side surface;
   a third lens element with negative refractive power having a convex aspheric object-side surface and a concave aspheric image-side surface, and the third lens element being formed with at least one inflection point;
   wherein the first lens element, the second lens element and the third lens element are made of plastic material;
   wherein a tangential angle of the image-side surface of the third lens element at a position of its effective optical diameter is ANG32, an on axis distance between the second lens element and the third lens element is T23, a center thickness of the third lens element is CT3, an Abbe number of the first lens element is V1, an Abbe number of the second lens element is V2, an Abbe number of the third lens element is V3, and they satisfy the relations:

$ANG32 < -10$ deg;

$T23/CT3 < 0.3$;

$(V1+V3)/2 - V2 > 20$.

9. A thin type optical lens system for taking image comprising three lens elements with refractive power, from the object side to the image side:
   a first lens element with positive refractive power having a convex object-side surface and a convex image-side surface;
   an aperture stop;
   a second lens element with negative refractive power having a concave aspheric object-side surface and a convex aspheric image-side surface;
   a third lens element with negative refractive power having a convex aspheric object-side surface and a concave aspheric image-side surface, and the third lens element being formed with at least one inflection point;
   wherein a height of the object-side surface of the third lens element at a position of its effective diameter is SAG31, an on axis distance between the second lens element and the third lens element is T23, a center thickness of the third lens element is CT3, and they satisfy the relations:

$SAG31 < 0.2$ mm;

$T23/CT3 < 0.3$.

10. A thin type optical lens system for taking image comprising three lens elements with refractive power, from the object side to the image side:
   a first lens element with positive refractive power;
   an aperture stop;
   a second lens element with negative refractive power having an aspheric object-side surface and an aspheric image-side surface;
   a third lens element with negative refractive power having an aspheric object-side surface and an aspheric image-side surface;
   wherein an on axis distance between the second lens element and the third lens element is T23, a center thickness of the third lens element is CT3, and they satisfy the relation $T23/CT3 < 0.3$;

wherein a radius of curvature of an object-side surface of the first lens element is R1, and a radius of curvature of an image-side surface of the first lens element is R2, and they satisfy the relation:

$-0.9 < R1/R2 < -0.1$.

11. The thin type optical lens system for taking image as claimed in claim 10, wherein a focal length of the first lens element is f1, a focal length of the thin type optical lens system for taking image is f, and they satisfy the relation:

$1.3 < f/f1 < 1.7$.

12. The thin type optical lens system for taking image as claimed in claim 10, wherein the focal length of the first lens element is f1, a focal length of the second lens element is f2, a focal length of the third lens element is f3, the focal length of the thin type optical lens system for taking image is f, and they satisfy the relations:

$1.35 < f/f1 < 1.5$ $-0.3 < f/f2 < 0$ $-0.2 < f/f3 < 0.$

13. The thin type optical lens system for taking image as claimed in claim 10, wherein the radius of curvature of the object-side surface of the first lens element is R1, and the radius of curvature of the image-side surface of the first lens element is R2, a radius of curvature of the object-side surface of the second lens element is R3, and a radius of curvature of the image-side surface of the second lens element is R4, a radius of curvature of the object-side surface of the third lens element is R5, and a radius of curvature of the image-side surface of the third lens element is R6, and they satisfy the relations:

$-0.8 < R1/R2 < -0.5$ $0.55 < R3/R4 < 0.85$ $0.9 < R5/R6 < 1.4.$

14. The thin type optical lens system for taking image as claimed in claim 10, wherein a refractive index of the first lens element is N1, a refractive index of the third lens element is N3, and they satisfy the relations:

$1.54 < N1 < 1.6$ $1.5 < N3 < 1.6.$

* * * * *

UNITED STATES PATENT AND TRADEMARK OFFICE
CERTIFICATE OF CORRECTION

PATENT NO. : 8,077,400 B2
APPLICATION NO. : 12/883181
DATED : December 13, 2011
INVENTOR(S) : Hsiang-Chi Tang It is certified that error appears in the above-identified patent and that said Letters Patent is hereby corrected as shown below:

Assignee in the title page, item (73),

Largen Precision Co., Ltd.

should be

Largan Precision Co., Ltd.

Signed and Sealed this
Fifth Day of June, 2012

David J. Kappos
*Director of the United States Patent and Trademark Office*